July 27, 1937.  O. E. NÖLKE  2,087,995
ARRANGEMENT FOR MEASURING DIRECT CURRENT
Filed March 7, 1934   3 Sheets-Sheet 1
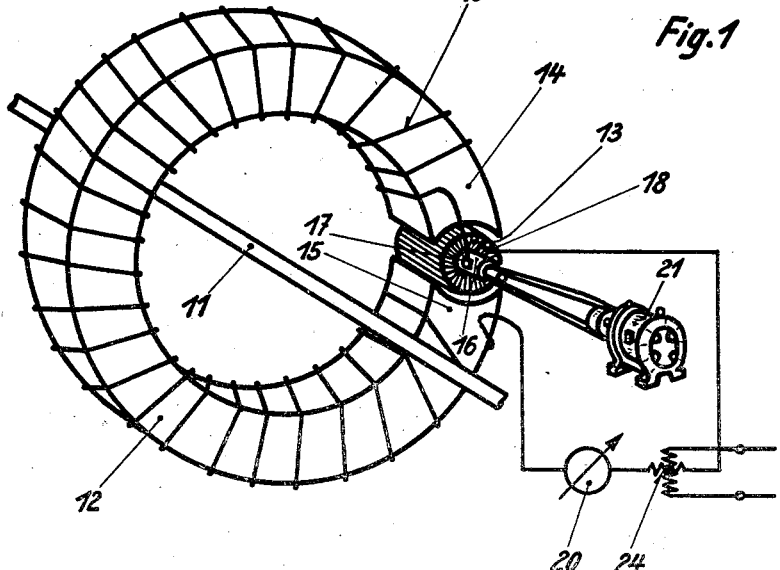
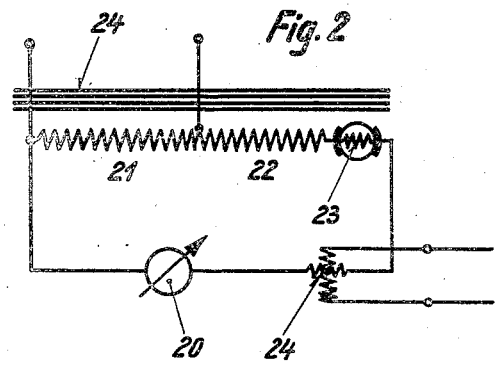
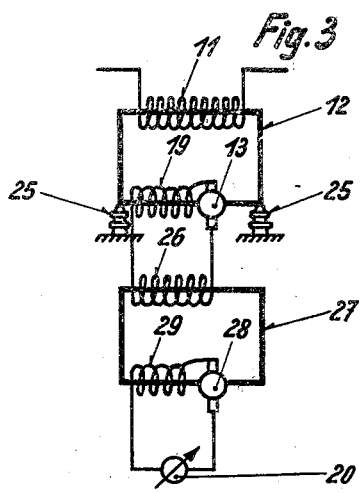
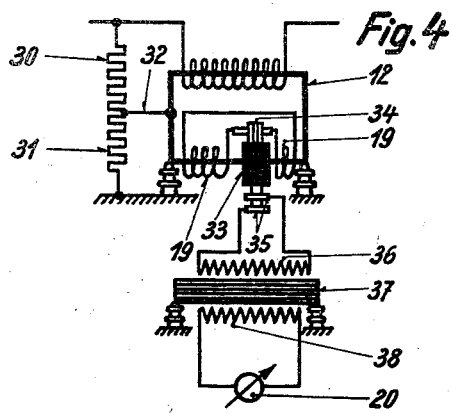
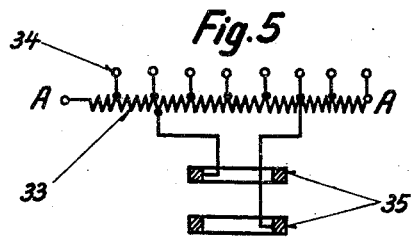
Inventor: Otto Erich Nölke
by Rudolph T. Berg
Attorney

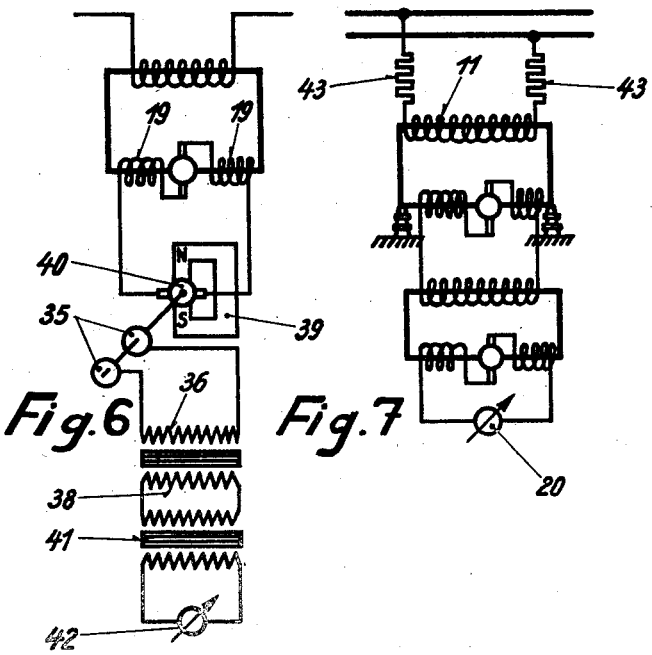

July 27, 1937.  O. E. NÖLKE  2,087,995

ARRANGEMENT FOR MEASURING DIRECT CURRENT

Filed March 7, 1934  3 Sheets-Sheet 3

Inventor: Otto Erich Nölke
by Rudolf P. Beer
Attorney

Patented July 27, 1937

2,087,995

UNITED STATES PATENT OFFICE 2,087,995

ARRANGEMENT FOR MEASURING DIRECT CURRENT

Otto Erich Nölke, Dresden, Germany, assignor to Koch and Sterzel, A. G., Dresden, Germany, a corporation of Germany Application March 7, 1934, Serial No. 714,497
In Germany March 17, 1933

7 Claims. (Cl. 171—95)

This invention relates to an arrangement for measuring direct current.

It is an object of the invention to provide a "direct current transformer", that is, a device which will make it possible to indicate directly a value which is proportional to the magnitude or unit to be measured.

It is a further object of the invention to provide various circuit arrangements for such a device which will render it adaptable for both heavy current work as well as light current work and also high and low voltage.

It is a still further object of the invention to provide arrangements whereby it will be possible to measure direct current and voltage in cases where the ordinary measuring instruments are not suited because of the high voltage or heavy current involved.

Further objects of the invention as well as advantages of the arrangements proposed will appear as the description thereof in the various embodiments proceeds.

The invention is illustrated in its various embodiments in the accompanying drawings, where:

Fig. 1 shows an embodiment of the direct current device of the invention arranged to measure the current in a conductor disposed in circuit relation therewith.

Fig. 2 illustrates the transformer arranged in a differential circuit.

Fig. 3 shows an arrangement wherein the primary is traversed by direct current, the current produced being used to supply a succeeding transformer.

Fig. 4 depicts the use of resistances to control the potential.

Fig. 5 illustrates an embodiment wherein the transformer is of the single core type with an armature provided with slip rings.

Fig. 6 shows a circuit wherein an alternator capable of generating a frequency proportional to the direct current is used as the further succeeding transformer.

Fig. 7 illustrates a "direct current transformer" of the invention connected in a cascaded circuit.

Figure 8:
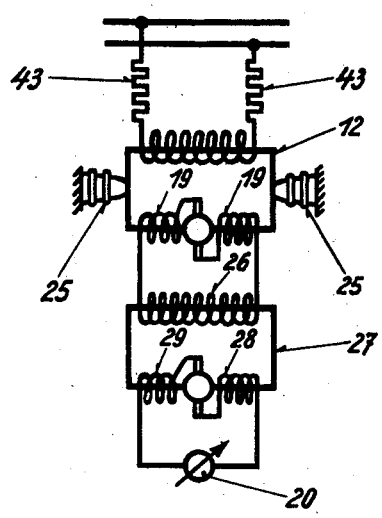
Fig. 8 shows the method of insulating the iron core.

When dealing with alternating current it is possible in a relatively simple manner to vary the relations of the voltage and current values by means of so-called transformers as by making use of the transformer principle. This, however, cannot be accomplished with direct current by known methods inasmuch as direct current, as is well known, cannot be transformed, in the generally accepted use of the term.

In accordance with the present invention this problem is solved by using a "direct current transformer" constructed after the fashion of an alternating current transformer and having a primary and a secondary circuit as well as an auxiliary or supplementary circuit comprising a supplementary winding interposed in the secondary winding and movably positioned in the exciter field circuit.

In its essential features the direct current transformer will then behave like a closed circuit series generator shunted across the measuring instrument the exciter field being magnetized by the primary direct current to be measured. The exciting winding must naturally be so wound and applied and the direction of rotation of the means used for driving the said so-called series generator must be so chosen that the exciting winding tends to buck the field produced by the primary current. Various embodiments of the invention are illustrated in the accompanying drawings.

According to Fig. 1, the conductor through which the current to be measured flows is indicated by 11 and constitutes the primary circuit of the "direct current transformer". Conductor 11 is surrounded by an annular iron core 12 which at one point is cut away to accommodate the armature 13 carrying the auxiliary or supplementary winding. The ends 14, 15 of the iron core 12 are formed into pole shoes. The voltage of the auxiliary winding, that is, the armature voltage, is taken off at collector 16 by means of two brushes 17, 18. One end of the exciter winding 19 wound around the iron core 12 is attached to brush 17, the other end of said winding being attached to brush 18 through the measuring instrument 20. The series generator thus connected across the auxiliary winding 13 and the measuring instrument 20 is driven by an auxiliary motor 21. The direction of current flow in the winding 19 is so chosen that it tends to demagnetize the core 12 which is magnetized by conductor 11. If the primary circuit comprises only one conductor 11 and the winding 19 has n-windings, then, during rotation of armature 13 a current will flow in winding 19 and hence in the measuring instrument 20 and will amount to an nth portion or multiple of the primary current, except for the magnetizing loss, which, however, as in the case of alternating current, may be compensated for by increasing the winding 19.

In lieu of using merely the one conductor 11 shown in the primary circuit, a plurality of windings may be disposed on the core in the well known manner.

It is also possible to use a so-called differential circuit with the "direct current transformer", as shown in Fig. 2. In this case the primary circuit is represented by the winding portion 21, the secondary circuit by the winding portion 22 and the interposed armature winding 23. The iron core 24 in this case is represented by an open iron core, and for the laminations (exciter iron) of the "direct current transformer" it is possible to use those of the type used generally in A. C. transformers. The transformer ratio may also be adjusted in such a "direct current transformer" by suitably proportioning the turns of the primary or secondary windings. It may also be arranged to feed the current coil 24 of a wattmeter interposed in the measuring current circuit after the fashion of the current coils of watt-hour meters.

The cutting in and cutting out of the motor 21 is preferably effected by a switch in the primary current circuit or in such portion thereof as is adaptable for causing the primary current to be cut out or cut in or regulated.

When it is desired to employ such an arrangement for the measurement of high voltage direct current, it is preferable to have the secondary winding of the current transformer act upon the primary circuit of another transformer. Hence in the "direct current transformer" herein described the cascade principle common in alternating current transformers is used. The cascading may be effected by causing the "direct current transformer" to produce an alternating current in its secondary circuit so that the next succeeding transformer will function as an alternating current transformer. The iron cores of the individual transformers in such case may then be at different potentials. These potentials are not proportional to the capacity of the circuit in the case of devices, but rather to the creepage resistance of the insulators. In case a particular potential is desired, the iron cores must be modified by high ohmic resistance control means.

Finally, there is still a further possibility,— that of using as the succeeding transformer, not only a device constructed in accordance with my invention or an alternating current transformer, but also an alternator capable of producing a frequency which is proportional to the primary current. The alternating current taken off at such alternator may then in turn be further cascaded.

What is possible in the case of the cascaded "direct current transformer" may also be effected in the case of cascaded "direct current transformers" as to voltage as by inserting a resistance in series with the primary winding of the current transformer and adapted to carry a current proportional to the high voltage. The measuring instrument disposed in the secondary circuit may then be calibrated in terms of voltage units; see the embodiment shown in Figs. 3 to 7.

In Fig. 3 the primary winding 11 is traversed by primary direct current. The iron core 12 is mounted on insulators 25 and carries the armature 13 which supplies the secondary winding 19 disposed on the iron core 12. In the secondary circuit, in lieu of the measuring instrument there is interposed the primary winding 26 on the iron core 27 of the next succeeding transformer. Armature 28 and the secondary winding 29 thus form the secondary circuit of this additional succeeding current transformer with which then the current measuring instrument 20 is associated.

In Fig. 4 the iron core 12 is controlled as to potential by line 32 and by resistances 30, 31 disposed between the high voltage and the ground. In the iron (core) field circuit there is located a specially formed armature which has both a direct current collector 34 as well as an alternating current slip ring 35. To the collector brushes 34 are attached the two halves of the secondary winding 19 and to the slip rings the primary winding 36 of the next succeeding transformer, which, in this case, is an alternating current transformer with iron core 37 and secondary winding 38 which supplies the current measuring instrument 20.

The circuit of the armature 33 (which is built like a single core transformer) is shown in Fig. 5. Here the collector 34 is represented by take-off leads, the winding between the points A and A being assumed to be closed. The slip rings 35 are applied to two points on the armature winding 33 spaced electrically 180° apart.

According to Fig. 6 an alternator capable of producing a frequency proportional to the direct current and serving as a further successive transformer is connected to the secondary winding 19 of the transformer, the alternator comprising a permanent magnet 39 and armature 40. The secondary winding 19 is closed through the direct current collector while the alternating current slip rings 35 supply the primary winding 36 of a further, succeeding alternating current transformer whose secondary winding 38 supplies the frequency measuring instrument 42 through a further transformer 41.

The advantage of this arrangement resides in the fact that the alternating current transformer 36, 38, 41 need not be of the proportional current type but may be any simple transformer. The accuracy of measurement is dependent on the degree of proportionality between the primary current and the speed of rotation of the alternator 39, 40.

Fig. 7 shows a cascaded direct current voltage transformer. The primary winding 11 of the transformer in this case need only have resistances 43 connected in series therewith. Otherwise the cascading arrangement remains exactly the same as in Fig. 3 with the difference that the measuring instrument 20 is calibrated in voltage units.

Likewise the resistances used for distributing potential to the different stages of the current transformer may be in the form of series resistances for the voltage transformer, and vice versa.

The auxiliary driving means required in the embodiments above described for moving the auxiliary winding may, in accordance with another feature of the invention be obviated by employing any suitable available power source for moving said auxiliary winding. Thus, if the measuring arrangement is to be used in the vicinity of the machine which produces the direct current, the driving motor of the direct current generator may be driven simultaneously with the auxiliary or supplementary winding since the armature may be adapted to rotate on the shaft of the power source or the shaft of the direct current generator. Likewise any suitable mechanical transmission means such as belt or chain drive may be used to connect the power source with the driving shaft of the movable auxiliary winding.

When the herein described arrangement for measuring direct current has one side grounded, a resistance is connected with it, or, if both terminals are used (in a complete metallic circuit) and provided with two resistances in series, and the scale of the current measuring device is calibrated in voltage units, then there is obtained an arrangement for measuring direct current voltage. When dealing with a direct current voltage measuring device of the type described the motor of the D. C. voltage transformer may be simultaneously used for driving the auxiliary winding of the current transformer.

When the current transformer or the voltage transformer (as just proposed) is to be operated in a cascaded circuit the auxiliary windings of the individual stages must each be individually driven by a separate motor each of which will then be of different potential. In such cases it is preferable also to use the motor nearest the grounded stage for driving the auxiliary winding connected with the stages of higher potential since the driving of the auxiliary windings of higher potential must then be effected through an insulated shaft by the motor used for the grounded stage.

In every case any already available source of power may be used for driving the auxiliary or supplementary winding and the various measuring arrangements.

If the measuring arrangement is to be used for measuring pulsating direct current, then in accordance with another feature of the invention, in determining the virtual (effective) and the arithmetical mean values, suitable instruments may be inserted into the secondary circuit of the current transformer for breaking up such pulsating direct current; such instruments may comprise a soft iron core instrument or dynamometer for the virtual (effective) value measurement and a rotating coil instrument for the arithmetical mean value measurement. The difference of the two measured values gives the magnitude of the "super wave". Since the difference between the indicated values in most cases is very small, precision instruments must be used for these measurements.

The measuring arrangement of the invention may also be used for measuring voltage by interposing resistances into the primary winding which carry current proportional to the high voltage and by calibrating the measuring instrument in voltage units. This voltage measuring arrangement may be used both for primary windings grounded on one side, that is, grounded networks, or also for non-grounded networks. Cascading may also be employed for this voltage transformer in the case of high voltage D. C. and the voltage transformer may also be used for output or work measurement by using the D. C. alone or with the aid of a further current transformer. Embodiments for these purposes are shown in Figs. 8 to 10.

In Fig. 8 the D. C. voltage transformer is modified to the extent that the secondary winding 19 of the first member of the primary winding 26 feeds a further current transformer with iron core 27, armature 28 and secondary winding 29. The iron core 12 is mounted on insulators 25.

Figure 9:
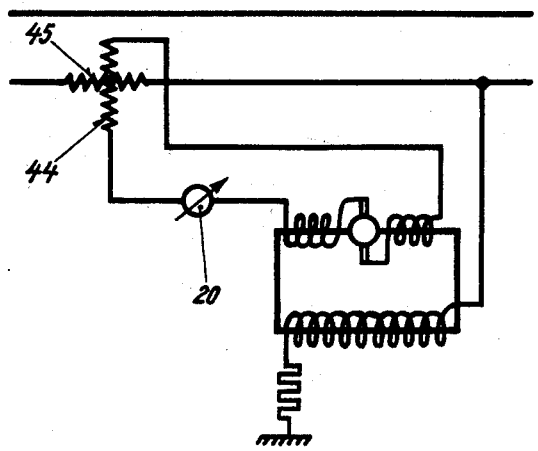
Fig. 9 illustrates the use of the transformer for measuring output in the case of high voltage.

Fig. 9 shows the use of the voltage transformer for supplying the voltage system 44 of an output or work measuring device whose current system 45 is directly traversed by D. C. The current measuring device 20, here again calibrated in voltage units and which is in series with the voltage system 44, indicates the voltage. In this case the measuring instruments are exposed to high voltage and can only be read from a distance.

Figures 10, 13:
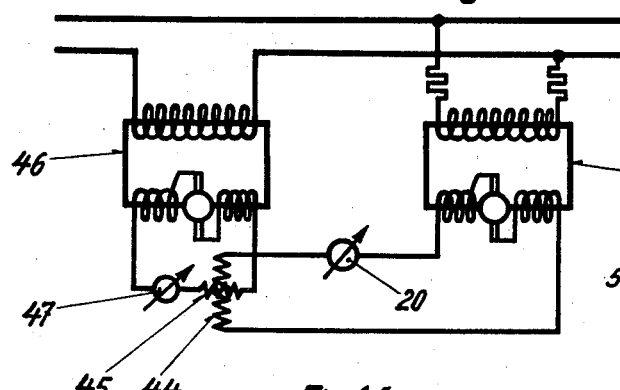
Fig. 10 depicts the arrangement of measuring instruments on the low voltage side.
Fig. 13 is similar to Fig. 12 and shows the use of a multi-stage amplifier arrangement.

In order to place the measuring instruments on the low voltage side, as shown in Fig. 10, a special current transformer 46 may be provided for the current system of the output measuring device. Its measuring instrument 47 then indicates the current and the instrument 20 of the voltage transformer indicates the voltage while the output or work measuring device 44, 45 indicates the product of both.

In the measuring arrangement shown in Fig. 1 the auxiliary winding operatively moved in the exciter field circuit operates directly and galvanically upon the secondary winding of the transformer. This scheme however cannot be used if the resistance of the secondary winding is so great that it cannot be supplied directly by the core moving in the exciter field circuit without making the proportions of the armature too large for commercial practice, this also being governed by the proportions of the exciter core. Such a case is presented when, for example, a plurality of the devices of Fig. 1 are to be connected in cascade.

Figure 11:
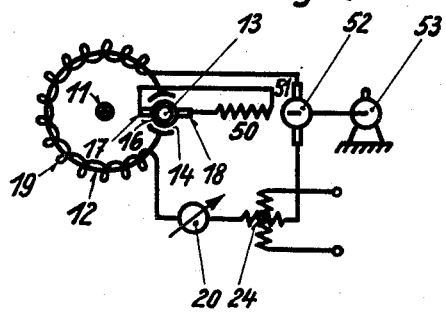
Fig. 11 shows the use of mechanically or magnetically operated amplifiers in conjunction with the arrangement of the invention.

According to Fig. 11 the primary winding 11 consists of only one conductor which passes through the exciter field 12 in whose pole-shoe gaps 14 the armature 13 moves. The voltage is taken off by collector 16 by means of brushes 17, 18 and fed to the exciter winding 50 of the generator 51 The armature 52 of this generator is driven by a special separate motor 53. It is however also possible to mount it on the same shaft as armature 13 so that only one driving motor is required. The armature 52 of the generator in turn supplies voltage to the secondary winding 19 with which the measuring instruments 20, 24 are connected in series.

Figure 12:
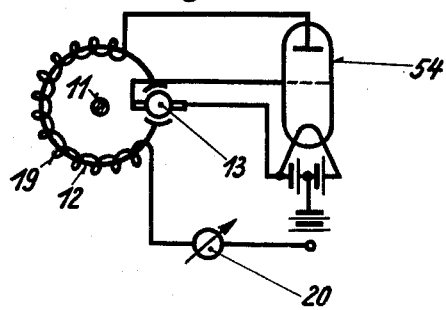
Fig. 12 illustrates the use of an electron tube relay amplifier device with the arrangement of the invention.

In Fig. 12 amplification is effected with the aid of the well known electron tube relay 54 which amplifies the current of the armature 13 and passes it to the secondary winding 19.

Fig. 13 shows a multi-stage amplifier using the arrangement of Fig. 16 except that in lieu of measuring instruments 20, 24, the primary winding of another current transformer 57 and armature 58 are interposed in circuit with the measuring instrument 20.

Various modifications may be embodied in the apparatus and circuit arrangements herein described without departing from the scope of the invention as defined in the appended claims.

I claim:

1. A device for measuring direct current comprising an electric conductor traversed by the current to be measured, an iron core electromagnetically associated with said conductor, a winding on the core, an auxiliary winding disposed within the magnetic field of the core, means for moving the auxiliary winding within the field, and a measuring instrument for measuring the current in the winding on the core, the windings being so connected with and proportioned to each other that the current flowing in the winding on the core is proportional to that flowing in the conductor and the current flowing in the auxiliary winding is a function of the current flowing in the conductor, and means for connecting said instrument to said auxiliary winding and said winding on the core.

2. A device for measuring direct current comprising an electric conductor traversed by the current to be measured, an iron core electromagnetically associated with said conductor, a winding on the core, an auxiliary winding disposed on a body of magnetic material lying in the magnetic field of the iron core, means for moving the body and the auxiliary winding within the magnetic field of the core, and a measuring instrument connected in series with both windings.

3. A device for measuring direct current comprising an electric conductor traversed by the current to be measured, an iron core electromagnetically associated with said conductor, a winding on the core, an auxiliary winding disposed on a rotatable armature, pole shoes formed on the core to provide an air gap in which the armature is disposed, and a driving motor for rotating the armature together with the auxiliary winding, a measuring instrument and means for connecting said instrument to said auxiliary winding and said winding on the core.

4. A device for measurnng direct current comprising an electric conductor traversed by the current to be measured, an iron core electromagnetically associated with said conductor, a winding on said core, an auxiliary winding disposed on a rotatable armature, pole shoes formed on the core to provide an air gap in which the armature is disposed, and a driving motor for rotating the armature together with the auxiliary winding, the winding on the core being so wound and applied that it tends to oppose the field produced by the direct current flowing in the conductor, a measuring instrument and means for connecting said instrument to said auxiliary winding and said winding on the core.

5. A device for measuring direct current comprising an electric conductor traversed by the current to be measured, an iron core electromagnetically associated with said conductor, a winding on the core, an auxiliary winding disposed within the magnetic field of the core, means for moving the auxiliary winding within the field, a commutator for collecting the current of the auxiliary winding and connected to the winding on the core, slip rings associated with the auxiliary winding, an alternating current transformer having its primary fed by the slip rings, a measuring instrument responsive to the current of the alternating current transformer secondary, and means for connecting said instrument to said alternating current transformer secondary.

6. A device for measuring direct current comprising an electric conductor traversed by the current to be measured, an iron core electromagnetically associated with said conductor, a winding on the core, an auxiliary winding disposed within the magnetic field of the core, means for moving the auxiliary winding within the field, an alternator associated with the auxiliary winding for producing current having a frequency proportional to the direct current to be measured, an instrument responsive to the alternating current frequency for measuring the direct current in the conductor, and means for connecting said instrument to said alternator.

7. A device for measuring direct current voltage comprising an electric circuit the potential difference between two points of which is to be measured, an electric conductor connected between these points, a resistance in series with the conductor, a transformer comprising an iron core electromagnetically associated with said conductor, a winding on the core, an auxiliary winding disposed within the magnetic field of the core, means for moving the auxiliary winding within the field of the core and an instrument responsive to the current in the conductor for indicating the voltage to be measured.

OTTO ERICH NÖLKE.